United States Patent
Shiraishi et al.

(10) Patent No.: US 6,680,810 B2
(45) Date of Patent: Jan. 20, 2004

(54) HEAD SUSPENSION ASSEMBLY WITH A PRECISE POSITIONING MICRO-CAP ACTUATOR COMPOSED OF A PIEZOELECTRIC MATERIAL

(75) Inventors: Masashi Shiraishi, Tokyo (JP); Takeshi Wada, Tokyo (JP); Takashi Honda, Tokyo (JP); Haruyuki Morita, Tokyo (JP); Mitsuyoshi Kawai, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 434 days.

(21) Appl. No.: 09/733,088

(22) Filed: Dec. 11, 2000

(65) Prior Publication Data

US 2001/0004303 A1 Jun. 21, 2001

(30) Foreign Application Priority Data

Dec. 15, 1999 (JP) .......................... 11-355727

(51) Int. Cl.[7] .............................. G11B 21/02
(52) U.S. Cl. .................. 360/75; 360/67; 360/244.1
(58) Field of Search ................ 360/69, 75, 294.4, 360/244.1, 234.4, 245.9, 234.7, 67; 361/749

(56) References Cited

U.S. PATENT DOCUMENTS

| | | | | |
|---|---|---|---|---|
| 5,055,969 A | * | 10/1991 | Putnam | 361/749 |
| 5,452,151 A | * | 9/1995 | Money et al. | 360/75 |
| 5,712,747 A | * | 1/1998 | Voldman et al. | 360/234.4 |
| 5,745,319 A | | 4/1998 | Takekado et al. | 360/78.05 |
| 5,856,895 A | * | 1/1999 | Schaenzer et al. | 360/234.7 |
| 6,239,947 B1 | * | 5/2001 | Fan et al. | 360/245.9 |
| 6,246,552 B1 | * | 6/2001 | Soeno et al. | 360/294.4 |

FOREIGN PATENT DOCUMENTS

| | | |
|---|---|---|
| EP | 0 902 427 A2 | 3/1999 |
| JP | 08-180623 | 7/1996 |
| WO | WO 99/23644 | 5/1999 |

* cited by examiner

*Primary Examiner*—David Hudspeth
*Assistant Examiner*—K. Wong
(74) *Attorney, Agent, or Firm*—Armstrong, Kratz, Quintos, Hanson & Brooks, LLP

(57) ABSTRACT

A HSA includes a magnetic head slider with at least one thin-film magnetic head element, an actuator fixed to the magnetic head slider for performing precise positioning of the at least one thin-film magnetic head element, an IC chip having a first circuit for the thin-film magnetic head element and a second circuit for driving the actuator, and a suspension for supporting the actuator and the IC chip.

12 Claims, 5 Drawing Sheets

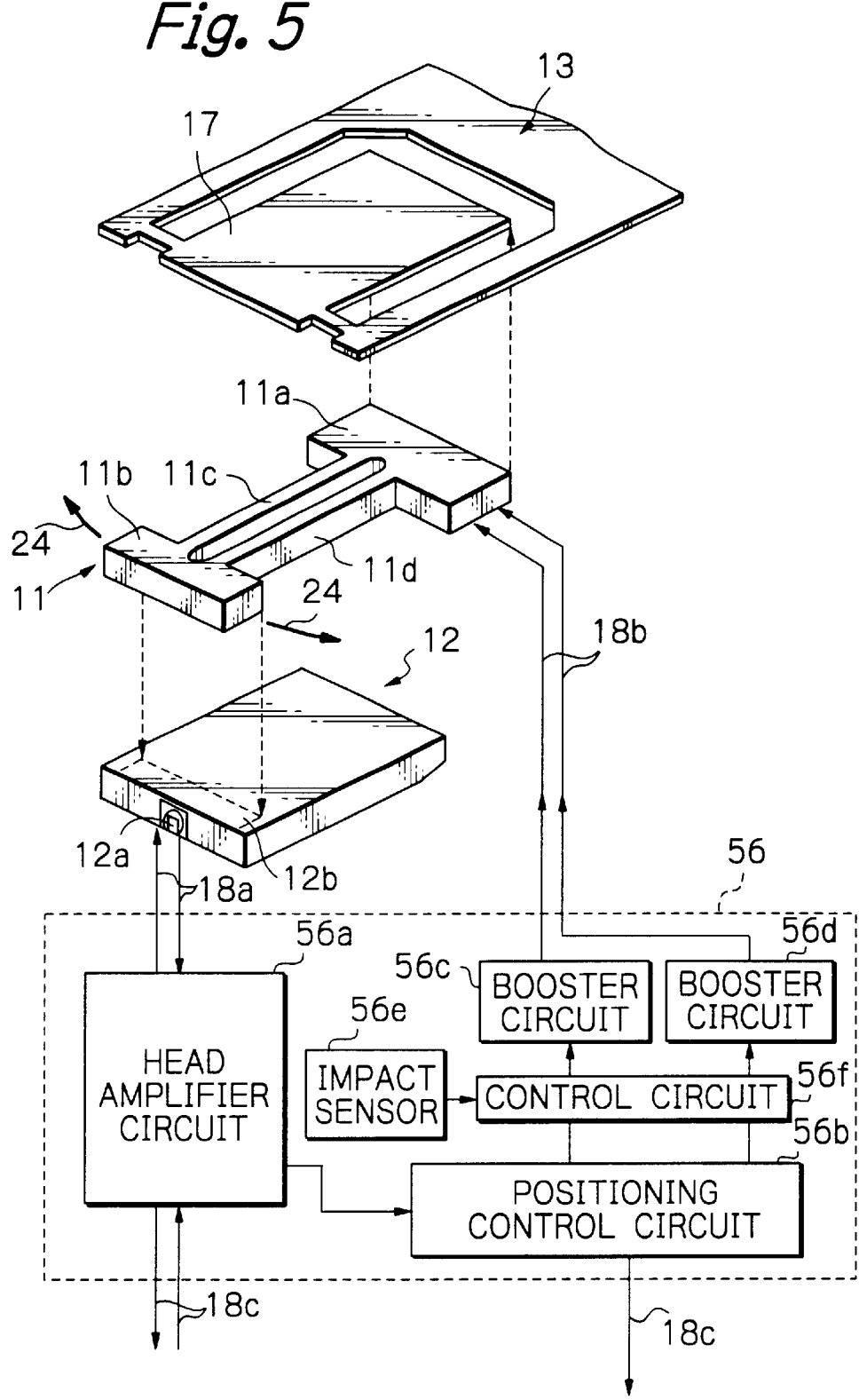

HEAD SUSPENSION ASSEMBLY WITH A PRECISE POSITIONING MICRO-CAP ACTUATOR COMPOSED OF A PIEZOELECTRIC MATERIAL

FIELD OF THE INVENTION

The present invention relates to a head suspension assembly (HSA) or a head gimbal assembly (HGA), with a precise positioning actuator for a thin-film magnetic head element used in a magnetic hard disk drive (HDD).

DESCRIPTION OF THE RELATED ART

In the magnetic HDD, thin-film magnetic head elements for writing magnetic information into and/or reading magnetic information from magnetic disks are in general formed on magnetic head sliders flying in operation above the rotating magnetic disks. The sliders are supported at top end sections of suspensions of the HSAs.

Recently, either recording and reproducing density along the track direction in the magnetic disk (bit density), or recording and reproducing density along the radial direction or along the track width direction in the magnetic disk (track density) rapidly increase to satisfy the requirement for ever increasing data storage capacities and densities in today's HDDs. Also, the requirement for high data rate in the HDDs increases and thus improvement in the speed of the disk rotation is advanced.

For advancing the bit density, because of a long distance between a head drive circuit and a thin-film magnetic head element, floating noises generated in the wiring for connecting the drive circuit with the head element have become a big problem. Also, for advancing the track density, the position control of the magnetic head element with respect to the track in the magnetic disk by a voice coil motor (VCM) only has never presented enough accuracy.

In order to solve the former problem, a drive IC (integrated circuit) chip having a part of the drive circuit of the magnetic head element is mounted on a suspension. Also, in order to solve the latter problem, another actuator mechanism is mounted at a position nearer to the magnetic head slider than the VCM so as to perform fine precise positioning that cannot be realized by the VCM only. The latter techniques for realizing precise positioning of the magnetic head are described in for example U.S. Pat. No. 5,745,319 and Japanese unexamined patent publication No. 8-180623.

However, even if either the bit density or the track density is advanced, it is very difficult to satisfy the recent requirement for further increased data storage densities in the HDDs.

It would have been considered that the mounting of both of the IC chip and the additional actuator on the same suspension more improve the data storage densities. However, if they are mounted together on the suspension, the following problems have occurred.

(1) The number of trace conductors formed on the suspension is greatly increased. In a typical magnetic head, for example a composite type magnetic head with a read head part of a magnetoresistive effect (MR) transducer element and a write head part of an inductive transducer element, four or more trace conductors are required for reading and writing operations and two or more additional trace conductors are required for driving the additional actuator. Thus, it is necessary to make six or more trace conductors on the suspension. That is twice of that in the conventional HSA. If the number of the trace conductors running on the suspension increases, noises due to the floating capacitance of the trace conductors may affect the read/write signals, and/or heat may be considerably generated on the suspension.

(2) Comparatively high voltage is required to drive the actuator. However, since the suspension has the IC chip on its middle section, it is very difficult to design a wiring of the HSA and a circuit of the HDD so as to form trace conductors for providing such high voltage to the actuator located at the top end section of the suspension from the HDD along the whole length of the suspension.

Thus, conventionally, the IC chip and the additional actuator never have been mounted together on the same suspension.

In addition, if a piezoelectric material type actuator is used, poor resistance to shock will become a large problem. Namely, such piezoelectric material type actuator may be physically broken and/or depolarized easily if a shock is applied in the direction that intersects its plane when a voltage is applied thereto.

SUMMARY OF THE INVENTION

It is therefore an object of the present invention to provide a HSA, whereby requirement for further increased data storage densities in HDDs can be sufficiently satisfied.

Another object of the present invention is to provide a HSA, whereby the number of trace conductors formed on a suspension can be reduced.

Further object of the present invention is to provide a HSA, whereby a wiring design of the HSA and a circuit design of a HDD can be easily carried out.

Still further object of the present invention is to provide a HSA, whereby physical breakage of and/or depolarization in piezoelectric material of an actuator by the shock can be effectively prevented even if a piezoelectric material type actuator is used.

According to the present invention, a HSA includes a magnetic head slider with at least one thin-film magnetic head element, an actuator fixed to the magnetic head slider for performing precise positioning of the at least one thin-film magnetic head element, an IC chip having a first circuit for the thin-film magnetic head element and a second circuit for driving the actuator, and a suspension for supporting the actuator and the IC chip.

Since both the IC chip and the actuator are mounted on the suspension, it is possible to increase the bit density and the track density together and therefore requirement for further increased data storage densities in HDDs can be sufficiently satisfied. Also, since the second circuit for driving the actuator is formed in the IC chip mounted on the suspension, the number of trace conductors formed on the suspension can be reduced. Thus, noises generated from the trace conductors, which will adversely affect the read/write signal of the magnetic head element, can be reduced from occurring, and heat generation due to current flowing through the trace conductors on the suspension can be also reduced.

It is preferred that the first circuit includes an amplifier circuit for amplifying a read signal from the at least one thin-film magnetic head element, and an amplifier circuit for amplifying or driving a write signal to the at least one thin-film magnetic head element.

It is also preferred the second circuit includes a first control circuit for producing a positioning signal depending upon the read signal from the at least one thin-film magnetic head element, and a booster circuit for boosting the produced positioning signal to produce a drive signal used for driving the actuator. Since such the booster circuits are also formed in the IC chip mounted on the suspension, the drive signals with a comparatively high voltage for the actuator will pass through only the conductors provided between the IC chip and the actuator resulting that a wiring design on the suspension becomes easy. In addition, since it is no necessary to generate such comparatively high voltage signals at the HDD, a circuit design of the HDD becomes easy and further its specification becomes simple.

Preferably, the read signal from the at least one thin-film magnetic head element is a servo signal generated at the at least one thin-film magnetic head element by reading out servo information preliminarily recorded on a magnetic disk.

It is preferred that the IC chip includes a third circuit for protecting the actuator from physical breakage and/or depolarization due to a shock applied thereto. In this case, the third circuit will include an impact detection circuit for detecting shock applied thereto, and a second control circuit for stopping supply of the drive signals to the actuator when the impact detection circuit detects the shock. Since the impact detection circuit is formed in the IC chip mounted on the suspension, a shock applied to the actuator mounted on the same suspension can be directly detected and application of the voltage to the actuator can be stopped by the second control circuit on timing. Therefore, physical breakage and/or depolarization of the actuator by the shock can be effectively prevented even if a piezoelectric material type actuator is used.

It is preferred that the actuator and the IC chip are located on one surface of the suspension. This one surface of the suspension may be a surface faced to a magnetic disk surface in operation.

It is also preferred that the HSA further includes a first conductor member with one end electrically connected to the at least one thin-film magnetic head element and the other end electrically connected to the IC chip, a second conductor member with one end electrically connected to the actuator and the other end electrically connected to the IC chip, and a third conductor member with one end electrically connected to the IC chip and the other end electrically connected to connection pads to be connected to an external circuit.

Preferably, the one end of the first conductor member is directly connected to terminals of the at least one thin-film magnetic head element by ball bonding or by stitch bonding.

It is further preferred that the first, second and third conductor members are formed by flexible print circuits with trace conductor layers sandwiched by insulation layers.

Further objects and advantages of the present invention will be apparent from the following description of the preferred embodiments of the invention as illustrated in the accompanying drawings.

BRIEF DESCRIPTION OF THE DRAWINGS

FIG. 5 is a view schematically illustrating an attachment structure of a precise positioning actuator and a magnetic head slider with a flexure and a circuit structure in an IC chip of a HSA as another embodiment according to the present invention.

DESCRIPTION OF THE PREFERRED EMBODIMENT

Figure 1:
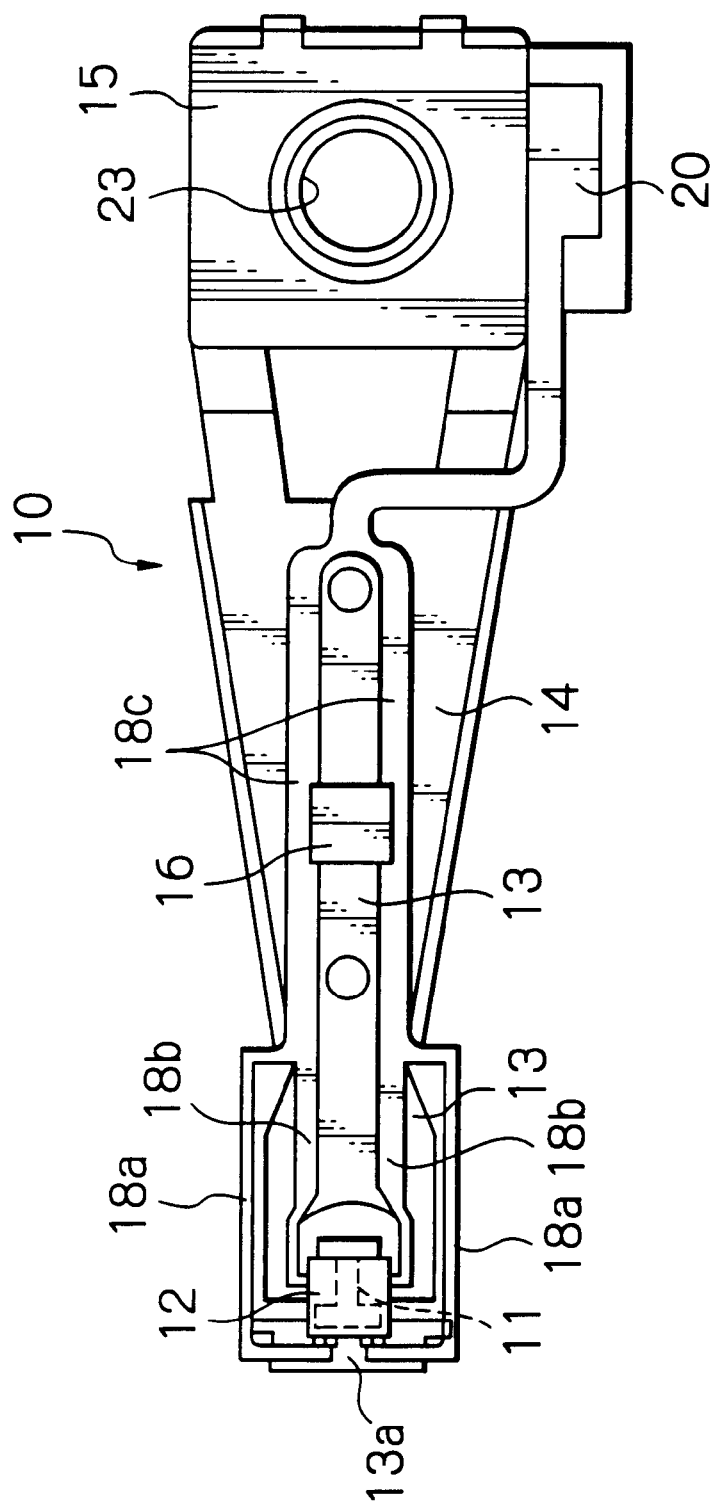
FIG. 1 is a top of view schematically illustrating whole structure of a HSA as a preferred embodiment according to the present invention.
Figure 2:
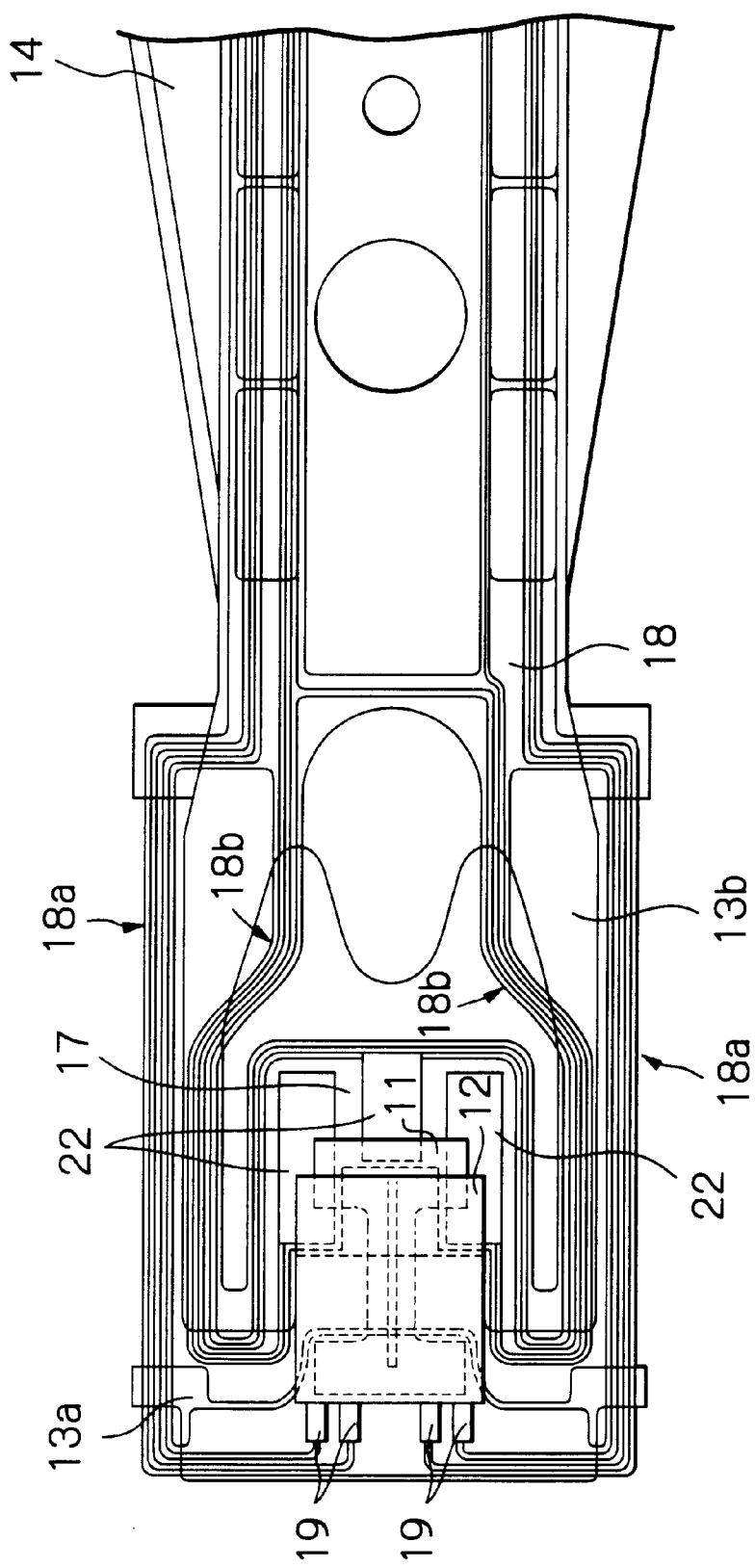
FIG. 2 is a plane view illustrating a top end section of the HSA shown in FIG. 1.
Figure 3:
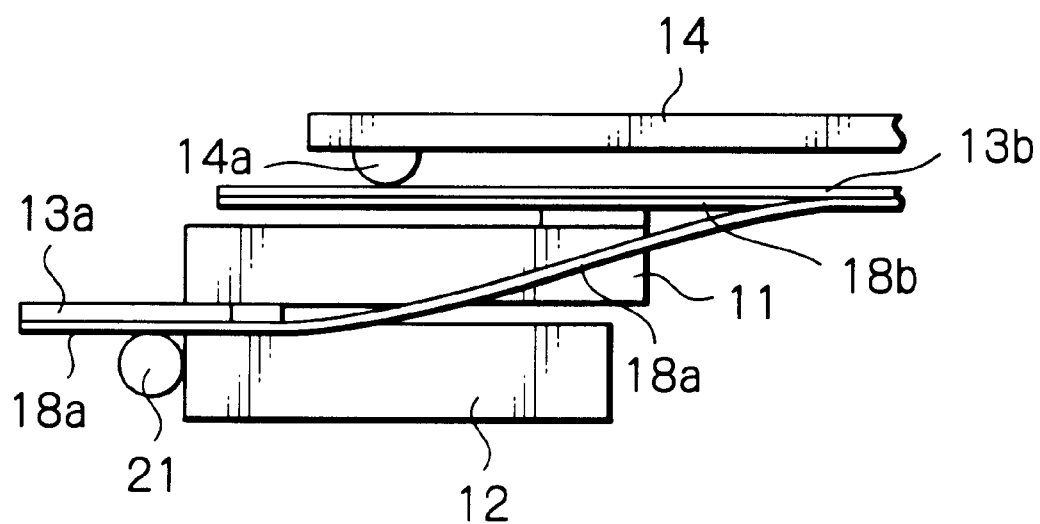
FIG. 3 is a side view schematically illustrating an attachment structure of a precise positioning actuator and a magnetic head slider with a flexure in the HSA shown in FIG. 1.
Figure 4:
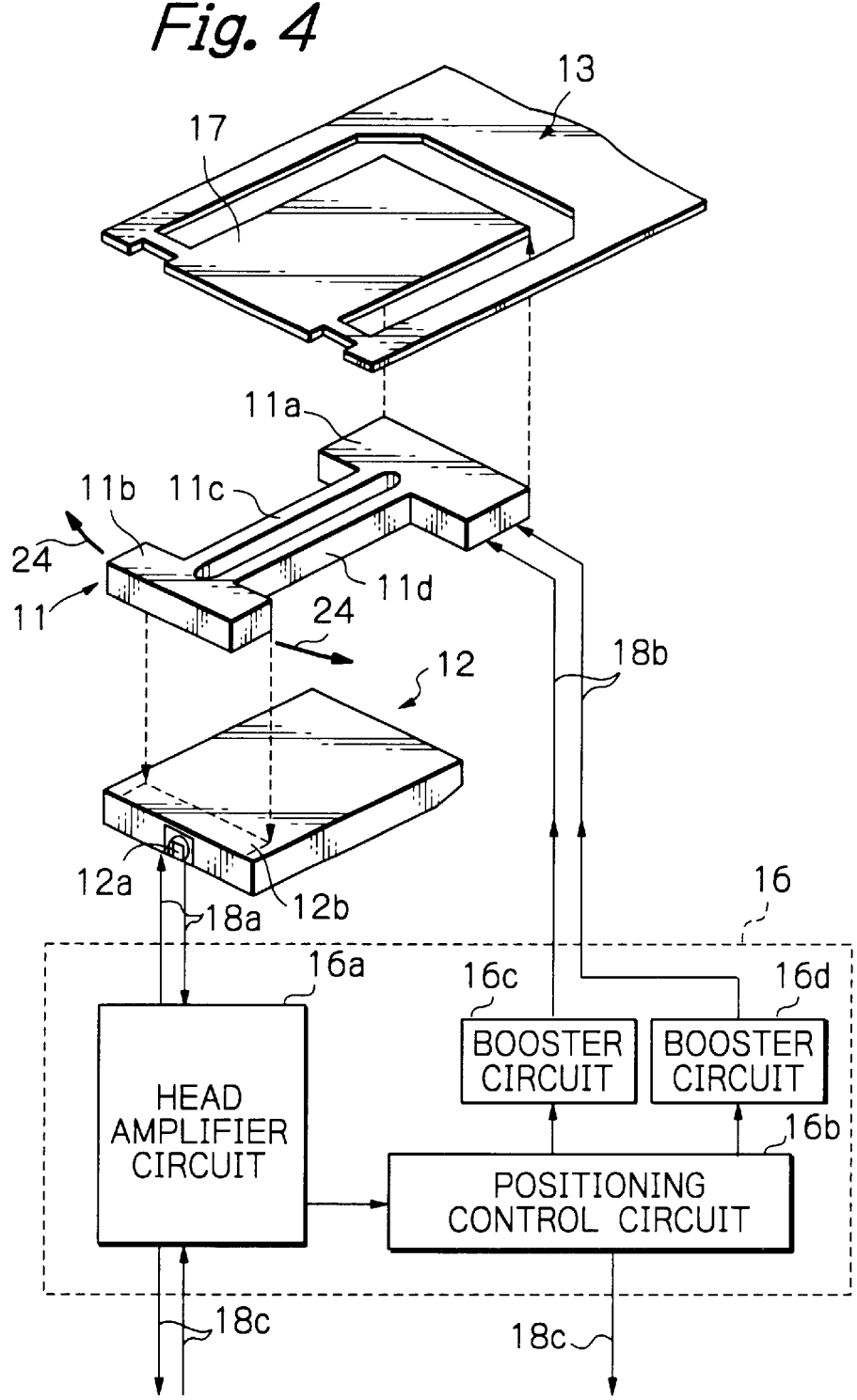
FIG. 4 is a view schematically illustrating an attachment structure of a precise positioning actuator and a magnetic head slider with a flexure and a circuit structure in an IC chip of the HSA shown in FIG. 1.

FIG. 1 schematically illustrates whole structure of a HSA (head suspension assembly) in a preferred embodiment according to the present invention and FIG. 2 illustrates in detail a top end section of the HSA. These figures are top of views seen from a slider-attached side. FIG. 3 schematically illustrates an attachment structure of a precise positioning actuator and a magnetic head slider with a flexure and FIG. 4 schematically illustrates the attachment structure and a circuit structure in an IC chip of the HSA shown in FIG. 1.

As shown in these figures, the HSA is assembled by fixing a fine tracking actuator 11 for precise positioning of a thin-film magnetic head element to a top end section of a suspension 10, and by fixing a magnetic head slider 12 with the thin-film magnetic head element 12a to the actuator 11. The magnetic head element 12a may have a read head part of a MR transducer element and a write head part of an inductive transducer element.

As is well known, a HDD has a main or course actuator of VCM for rotationally moving a movable arm to which such HSA is attached. The actuator 11 contributes the fine positioning of the HSA, which cannot be adjusted by the main or course actuator.

The actuator 11 has as will be described in detail later a single layer structure or a multi-layered structure including a piezoelectric material layer which expands and contracts by their reverse piezoelectric effect. The actuator 11 is mechanically coupled to the slider 12 and mechanically and electrically coupled to the suspension 10. The size of the actuator 11 is substantially equal to that of the slider 12 with for example 1.25 mm×1.0 mm×0.3 mm. In this embodiment, the actuator 11 is mounted at a position of the top end section of the suspension 10, near the slider 12, in consideration of its mechanical and electrical performance.

As shown in FIG. 1, a drive IC chip 16 is mounted on a middle location of the suspension 10. In this IC chip 16, as will be mentioned later, head amplifiers for the magnetic head element 12a and a drive circuit for the actuator 11 are formed. Although it is a mere example, the size of the IC chip 16 is 1.4 mm×1.0 mm×0.125 mm.

In the embodiment, the actuator 11, the slider 12 and the IC chip 16 are mounted on a surface of the suspension 10, which surface will be faced to the magnetic disk surface in operation.

The suspension 10 is substantially formed by a resilient flexure 13 which carries the slider 12 through the actuator 11 at its tongue 17 located near its top end section and carries the IC chip 16 at its middle section, a resilient load beam 14 which supports and fixes the flexure 13, and a base plate 15 formed at a base end section of the load beam 14.

The load beam 14 has elasticity for pressing the slider 12 through the actuator 11 toward the direction of a magnetic disk in operation.

The flexure 13 has the flexible tongue 17 depressed by a dimple (projection) formed on the load beam 14 and has elasticity for supporting flexibly the slider 12 through the actuator 11 by this tongue. As will be noted, in this embodiment, the suspension 10 has a three-pieces structure constituted by individual components of the flexure 13, the load beam 14 and the base plate 15. In such three-pieces structure, stiffness of the flexure 13 is set to be lower than that of the load beam 14.

The flexure 13 is made of in this embodiment a stainless steel plate (for example SUS304TA) with a thickness of about 25 μm. As will be described later, a top end section 13a of the flexure 13 is separated from other section 13b of the flexure 13.

On the flexure 13 and out of the flexure 13, flexible conductor members 18a, 18b and 18c each including a plurality of trace conductors of a thin-film multi-layered pattern are formed. The conductor members 18a, 18b and 18c are formed by a known method similar to the patterning method of forming a printed circuit board on a thin metal plate such as a flexible printed circuit (FPC). For example, the members 18a, 18b and 18c are formed by sequentially depositing a first insulation material layer made of a resin such as polyimide with a thickness of about 10 μm, a patterned Cu layer (trace conductor layer) with a thickness of about 10 μm, and a second insulation material layer made of a resin such as polyimide with a thickness of about 5 μm on the flexure 13 in this order. Within the regions of the connection pads formed for connecting with the IC chip 16, the actuator 11, the magnetic head slider 12a and an external circuit, an Au layer is deposited on the Cu layer and there is no second insulation material layer on the Au layer.

In this embodiment, as shown in FIG. 2 in detail, the first conductor member 18a includes two trace conductors connected to the magnetic head element for one side, thus four trace conductors for both sides, and the second conductor member 18b includes two trace conductors connected to the actuator 11 for one side, thus four trace conductors for both sides. The third conductor member 18c is used for connecting the IC chip 16 with external circuit connection pads 20 provided for connection with the external circuit.

One end of the trace conductors of the first conductor member 18a is electrically connected to head element connection pads 19 formed on the individually separated top end section 13a of the flexure 13. The connection pads 19 are ball-bonded to terminal electrodes of the magnetic head slider 12 by Au balls 21 as shown in FIG. 3. The other end of the trace conductors of the first conductor member 18a is electrically connected to IC chip connection pads (not shown) provided for connection with the IC chip 16.

As will be apparent from FIG. 3, the first conductor member 18a consists of a first section formed on the other section 13b of the flexure 13, a second section floating in the air at both sides of the actuator 11 and the magnetic head slider 12, and a third section formed on the individually separated top end section 13a of the flexure 13. The top end section 13a and the other section 13b of the flexure 13 are located in different planes, respectively. However, since the air-floating section of the first conductor member 18a can freely bend, electrical connection between the conductor member 18a and the magnetic head element can be ensured without applying stress to the individually separated top end section 13a of the flexure 13.

Instead of the ball bonding, stitch bonding can be executed for connecting the terminal electrodes of the magnetic head slider 12 with the connection pads 19.

One end of trace conductors of the second conductor member 18b is electrically connected to actuator connection pads 22 formed on the tongue 17 of the flexure 13. The connection pads 22 are connected to terminal electrodes of the actuator 11. The other end of trace conductors of the second conductor member 18b is electrically connected to the IC chip connection pads (not shown) provided for connection with the IC chip 16.

One end of trace conductors of the third conductor member 18c is electrically connected to the IC chip connection pads, and the other end thereof is electrically connected to the external circuit connection pads 20.

The load beam 14 is made of in this embodiment a resilient stainless steel plate with a thickness of about 60–65 μm and supports the other section 13b of the flexure 13 along its whole length. This load beam 14 has a shape with a width that narrows with approaching to its top end. Fixing of the flexure 13 to the load beam 14 is achieved by means of a plurality of welded spots.

The base plate 15 is made of a stainless steel or iron and is fixed to the base end section of the load beam 14 by welding. The suspension 10 will be attached to each movable arm (not shown) by fixing an attachment part 23 of the base plate 15 to the movable arm.

In modification, the suspension may be formed in a two-pieces structure with a base plate and a flexure-load beam instead of the three-pieces structure with the flexure 13, the load beam 14 and the base plate 15.

As shown in FIG. 4, a fixed part 11a of the actuator 11 is fixed to the tongue 17 of the flexure 13. The fixing of the actuator 11 to the tongue 17 may be achieved by solder bonding terminal electrodes formed on the fixed part 11a of the actuator 11 with connection pads 22 formed on the tongue 17 of the flexure 13, by adhering using conductive adhesives the terminal electrodes formed on the fixed part 11a of the actuator 11 with the connection pads 22 formed on the tongue 17 of the flexure 13, or by adhering using adhesives the fixed part 11a of the actuator 11 with the tongue 17 of the flexure 13. A movable part 11b of the actuator 11 is directly fixed by using adhesives to a rear end section 12a at which side a magnetic head element 12b is formed, of the slider 12, or indirectly fixed by using adhesives to the rear end section 12a through the top end section 13a of the flexure 13.

The actuator 11 has the fixed part 11a, the movable part 11b, and two rod shaped beam parts 11c and 11d for coupling these fixed and movable parts 11a and 11b. Each of the beam parts 11c and 11d is formed by at least one piezoelectric material layer sandwiched by electrode layers. By applying voltage across the electrode layers, the piezoelectric material layer expands and contracts. The piezoelectric material layer is made of material that expands and contracts by reverse piezoelectric effect or by electrostrictive effect.

As aforementioned, one end of the beam parts 11c and 11d is united with the fixed part 11a and this fixed part 11a is fixed to the flexure 13. The other end of the beam parts 11c and 11d is united with the movable part 11b and this movable part 11b is fixed to the slider 12. Thus, bending motion of the beam parts 11c and 11d due to their expanding and contracting generates the displacement of the movable part 11b and therefore the displacement of the slider 12. This displacement of the slider 12 results the swing of the magnetic head element along an arc so as to cross recording tracks of the magnetic disk surface.

In case that the piezoelectric material layer of the beam parts 11c and 11d is made of piezoelectric material such as PZT (Lead Zirconate Titanate), the piezoelectric material layers are in general polarized so as to improve their displacement performance. The polarized direction is the thickness direction of the actuator 11. When voltage is applied across the electrode layers and the direction of the produced electrical field is the same as the polarized direction, the piezoelectric material layer between the electrode layers expands in its thickness direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its thickness direction (piezoelectric longitudinal effect) and expands in its in-plane direction (piezoelectric lateral effect). If the voltage with a polarity which will induce the contraction is applied to the beam parts 11c and 11d alternately, a ratio between the length of one beam part and the other beam part changes resulting that both the beam parts 11c and 11d bend toward the same direction in a plane of the actuator 11. By this bending motion, the movable part 11b swings around the fixed part 11a along the arrow 24 shown in FIG. 4. If no voltage is applied, the movable part 11b stays at the center position.

This swing is the displacement of the movable part 11b to draw an arc locus in the direction substantially perpendicular to the expanding and contracting direction of the beam parts 11c and 11d and the arc locus is in a plane of the actuator 11. Therefore, the magnetic head element also swings to draw the arc locus. Due to operating the same direction between the applied voltage and the polarization in the piezoelectric material layer, no attenuation in polarization in occurs.

Similar swing motion can be obtained even if the voltage alternately applied to the beam parts 11c and 11d is that inducing expansion of the beam parts.

In the embodiment, voltages that induce mutually reverse motions may be simultaneously applied to the beam parts 11c and 11d, respectively. In other words, AC voltages may be simultaneously applied to the beam parts 11c and 11d so that one beam part expands when the other beam part contracts and vice versa. The swing motion of the movable part 11b is centered when no voltage is applied to the beam parts. In this case, the amplitude of the swing motion of the movable part 11b becomes about twice of that when the voltage is alternately not simultaneously applied to the beam parts under the condition that the driving voltage levels are the same.

However, in this case, one of the beam parts is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The swing motion of the movable part is centered when only the bias voltage is applied to the beam parts.

The actuator 11 has in this embodiment a united structure of the fixed part 11a, the movable part 11b, and the beam parts 11c and 11d with a hole and notches formed through a single layer or multilayers of piezoelectric material with partially formed electrode layers. Thus, high rigidity and accurate dimensions of the actuator can be expected without occurring assembling error. Also, since no adhesive is used for fabricating the actuator, no adhesive layer exists at the portion where stress will be produced by the deformation of the beam parts. Thus, no mechanical transformation loss due to the adhesive layer and no deterioration in adhesive strength occur.

In this specification, the piezoelectric material is material that expands or contracts by their reverse piezoelectric effect or electrostrictive effect. Any piezoelectric material applicable for the beam parts of the actuator can be used. However, for high rigidity, it is desired to use a ceramics piezoelectric material such as $PZT[Pb(Zr,Ti)O_3]$, $PT(PbTiO_3)$, $PLZT[(Pb,La)(Zr,Ti)O_3]$, or barium titanate $(BaTiO_3)$.

As aforementioned, the drive IC chip 16 is mounted on the surface at the middle length location of the suspension 10. This location of the IC chip 16 is determined so as to improve the cooling effect and the electromagnetic characteristics of the IC chip and to execute easy mounting of the IC chip. The IC chip 16 in this embodiment is formed by a bear chip and mounted on and connected to the IC chip connection pads.

An underfill is filled in a clearance between the bottom surface of the IC chip 16 and the thin-film pattern surface so as to improve heat radiation characteristics, to improve mechanical strength of this area, and to cover a part of the IC chip 16.

As shown in FIG. 4, in the IC chip 16, a head amplifier circuit 16a for amplifying read and write signals from and to the thin-film magnetic head element 12a, a positioning control circuit 16b for producing a control signal for the main actuator (VCM) and precise control signals for precise positioning of the actuator 11 depending upon servo signals of the magnetic head element 12a provided from the circuit 16a, and booster circuits 16c and 16d for boosting the precise positioning control signal from the circuit 16b to generate drive signals applied to the actuator 11 are formed.

The head amplifier circuit 16a is a general head amplifier for amplifying an analog signal.

The positioning control circuit 16b generates, depending upon the servo signals provided from the magnetic head element 12a, the control signal applied to the main actuator (VCM) and the precise positioning control signals used for precise positioning of the actuator 11. The servo signals are generated at the magnetic head element 12a by reading out servo information preliminarily recorded on the magnetic disk. The circuit configuration of the positioning control circuit 16b is known.

The booster circuits 16c and 16d boost the precise positioning control signals of 3–5 V or less to voltage signals of about 15 V that is required for driving the piezoelectric material type actuator 11. The voltage of the precise positioning control signal will be 3–5 V at maximum because the source voltage supplied to the IC chip 16 is about 3–5 V. Such booster circuit can be constituted by a boost switching regulator or by a boost converter consisting of a power MOSFET and a switching regulator controller for driving the power MOSFET. In the latter case, a current mode switching regulator controller LTC1624 of Linear Technology Co., Ltd. or its equivalent circuit may be used for the switching regulator controller for example.

In this embodiment, these head amplifier circuit 16a, the positioning control circuit 16b, and the booster circuits 16c and 16d are integrated in the single IC chip 16.

As aforementioned in detail, according to this embodiment, since both the IC chip 16 and the actuator 11 are mounted on the suspension 10, it is possible to increase the bit density and the track density together and therefore requirement for further increased data storage densities in HDDs can be sufficiently satisfied. Also, since the positioning control circuit 16b for generating drive signals of the actuator 11 is integrated in the IC chip 16 mounted on the suspension 10, the number of trace conductors formed on the suspension 10 can be reduced. Thus, noises generated from the trace conductors, which will adversely affect the read/write signal of the magnetic head element, can be reduced from occurring, and heat generation due to current flowing through the trace conductors on the suspension can be also reduced.

Furthermore, since the booster circuits 16c and 16d are also integrated in the IC chip 16 mounted on the suspension 10, the drive signals with a comparatively high voltage for the actuator 11 will pass through only the second conductor member 18b provided between the IC chip 16 and the actuator 11 resulting a wiring design on the suspension becomes easy. In addition, since it is no necessary to generate such comparatively high voltage signals at the HDD, a circuit design of the HDD becomes easy and further its specification becomes simple.

FIG. 5 schematically illustrates an attachment structure of a precise positioning actuator and a magnetic head slider with a flexure and a circuit structure in an IC chip of a HSA as another embodiment according to the present invention.

Configurations, operations and advantages of this embodiment are the same as those of the embodiment of FIG. 1 except for the configuration in the IC chip 56. Thus, the same components as the embodiment of FIG. 1 use the same reference numerals and their explanations are omitted.

As shown in FIG. 5, in the IC chip 56, a head amplifier circuit 56a for amplifying read and write signals from and to the thin-film magnetic head element 12a, a positioning control circuit 56b for producing a control signal for the main actuator (VCM) and precise control signals for precise positioning of the actuator 11 depending upon servo signals of the magnetic head element 12a provided from the circuit 56a, booster circuits 56c and 56d for boosting the precise positioning control signal from the circuit 56b to generate drive signals applied to the actuator 11, an impact sensor 56e for detecting a shock applied thereto, and a control circuit 56f for stopping supply of the drive signals to the actuator 11 when the impact sensor 56e detects shock are formed.

The head amplifier circuit 56a is a general head amplifier for amplifying an analog signal.

The positioning control circuit 56b generates, depending upon the servo signals which are obtained the magnetic head element 12a by reading out servo information preliminarily recorded on the magnetic disk, the control signal applied to the main actuator (VCM) and the precise positioning control signals used for precise positioning of the actuator 11. The circuit configuration of the positioning control circuit 56b is known.

The booster circuits 56c and 56d boost the precise positioning control signals of 3–5 V or less to voltage signals of about 15 V that is required for driving the piezoelectric material type actuator 11. The voltage of the precise positioning control signal will be 3–5 V at maximum because the source voltage supplied to the IC chip 56 is about 3–5 V. Such booster circuit can be constructed by a boost switching regulator or by a boost converter consisting of a power MOSFET and a switching regulator controller for driving the power MOSFET. In the latter case, a current mode switching regulator controller LTC1624 of Linear Technology Co., Ltd. or its equivalent circuit may be used for the switching regulator controller for example.

The impact sensor 56e is a shock sensor or an acceleration sensor. As for an example of the former, there is a shock sensor for HDD B451ASH of TDK Corporation. As for an example of the later, there is an acceleration sensor ADXL202 of Analog Devices Inc. or an acceleration sensor MAS1301T of Mitsubishi Electric Corporation.

The control circuit 56f is a switch circuit and may be constructed by a switch element that intercepts control signals to the booster circuit 56c and 56d when a shock detected signal is applied from the impact sensor 56e. In modification, this control circuit 56f may be inserted at the output side of the positioning control circuit 56e, or formed inside of the positioning control circuit 56e.

In this embodiment, these head amplifier circuit 56a, the positioning control circuit 56b, the booster circuits 56c and 56d, the impact sensor 56e and the control circuit 56f are integrated in the single IC chip 56.

As aforementioned in detail, according to this embodiment, since both the IC chip 56 and the actuator 11 are mounted on the suspension 10, it is possible to increase the bit density and the track density together and therefore requirement for further increased data storage densities in HDDs can be sufficiently satisfied. Also, since the positioning control circuit 56b for generating drive signals of the actuator 11 is integrated in the IC chip 56 mounted on the suspension 10, the number of trace conductors formed on the suspension 10 can be reduced. Thus, noises generated from the trace conductors, which will adversely affect the read/write signal of the magnetic head element, can be reduced from occurring, and heat generation due to current flowing through the trace conductors on the suspension can be also reduced.

Furthermore, since the booster circuits 56c and 56d are also integrated in the IC chip 56 mounted on the suspension 10, the drive signals with a comparatively high voltage for the actuator 11 will pass through only the second conductor member 18b provided between the IC chip 56 and the actuator 11 resulting a wiring design on the suspension becomes easy. In addition, since it is no necessary to generate such comparatively high voltage signals at the HDD, a circuit design of the HDD becomes easy and further its specification becomes simple.

Also, according to this embodiment, since the impact sensor 56e is formed in the IC chip 56 mounted on the suspension 10, a shock applied to the actuator 11 mounted on the same suspension 10 can be directly detected and application of the voltage to the actuator 11 can be stopped by the control circuit 56f on timing. Therefore, physical breakage and/or depolarization of the actuator by the shock can be effectively prevented even if a piezoelectric material type actuator is used.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head suspension assembly comprising:
a magnetic head slider with at least one thin-film magnetic head element;
an actuator fixed to said magnetic head slider for performing precise positioning of said at least one thin-film magnetic head element composed of a piezoelectric material having a fixed part, a movable part two beam parts connecting the fixed part to the movable part, wherein when a current is applied to the actuator, the two beam parts bend moving the movable part in a plane parallel to the plane of a disc;

an integrated circuit chip, separated from said actuator, having a first circuit for said thin-film magnetic head element and a second circuit for driving said actuator; and a suspension for supporting said actuator at its top end section and said integrated circuit chip at its middle section.

2. The head suspension assembly as claimed in claim 1, wherein said first circuit includes an amplifier circuit for amplifying a read signal from said at least one thin-film magnetic head element, and an amplifier circuit for amplifying a write signal to said at least one thin-film magnetic head element.

3. The head suspension assembly as claimed in claim 1, wherein said second circuit includes a first control circuit for producing a positioning signal depending upon the read signal from said at least one thin-film magnetic head element, and a booster circuit for boosting said produced positioning signal to produce a drive signal used for driving said actuator.

4. The head suspension assembly as claimed in claim 3, wherein said read signal from said at least one thin-film magnetic head element is a servo signal generated at said at least one thin-film magnetic head element by reading out servo information preliminarily recorded on a magnetic disk.

5. The head suspension assembly as claimed in claims 3, wherein said integrated circuit chip includes a third circuit for protecting said actuator from physical breakage and/or depolarization due to shock applied thereto.

6. The head suspension assembly as claimed in claim 5, wherein said third circuit includes an impact detection circuit for detecting shock applied thereto, and a second control circuit for stopping supply of the drive signals to said actuator when the impact detection circuit detects the shock.

7. The head suspension assembly as claimed in claim 1, wherein said actuator and said integrated circuit chip are located on one surface of said suspension.

8. The head suspension assembly as claimed in claim 7, wherein said one surface of the suspension is a surface faced to a magnetic disk surface in operation.

9. The Head Suspension Assembly as claimed in claim 1, wherein said head suspension assembly further comprises a first conductor member with one end electrically connected to said at least one thin-film magnetic head element and the other end electrically connected to said integrated circuit chip, a second conductor member with one end electrically connected to said actuator and the other end electrically connected to said integrated circuit chip, and a third connector member with one end electrically connected to said integrated circuit chip and the other end electrically connected to connection pads to be connected to an external circuit.

10. The head suspension assembly as claimed in claim 9, wherein said one end of said first conductor member is directly connected to terminals of said at least one thin-film magnetic head element by ball bonding.

11. The head suspension assembly as claimed in claim 9, wherein said one end of said first conductor member is connected to terminals of said at least one thin-film magnetic head element by stitch bonding.

12. The head suspension assembly as claimed in claim 9, wherein said first, second and third conductor members are formed by flexible print circuits with trace conductor layers sandwiched by insulation layers.

* * * * *